United States Patent [19]
Harris

[11] Patent Number: 5,921,079
[45] Date of Patent: Jul. 13, 1999

[54] EMISSION CONTROL APPARATUS

[75] Inventor: Harold L. Harris, Cypress, Tex.

[73] Assignee: Harris International Sales Corporation, Houston, Tex.

[21] Appl. No.: 08/962,697

[22] Filed: Nov. 3, 1997

[51] Int. Cl.[6] .............................. F01N 3/00; B01D 50/00
[52] U.S. Cl. ............................... 60/288; 60/299; 422/177
[58] Field of Search .......................... 60/287, 288, 291, 60/299; 422/176, 177, 180

[56] References Cited

U.S. PATENT DOCUMENTS

| | | | |
|---|---|---|---|
| 3,793,830 | 2/1974 | August | 60/289 X |
| 5,016,438 | 5/1991 | Harris | 60/299 |
| 5,048,287 | 9/1991 | Howe et al. | 60/299 X |
| 5,138,835 | 8/1992 | Bender et al. | 60/288 X |
| 5,144,796 | 9/1992 | Swars | 60/288 |
| 5,326,537 | 7/1994 | Cleary | 422/177 X |
| 5,345,762 | 9/1994 | Lutze | 60/288 |
| 5,396,764 | 3/1995 | Rao et al. | 60/287 X |
| 5,582,003 | 12/1996 | Patil et al. | 60/288 X |
| 5,635,141 | 6/1997 | Fischer | 422/180 X |
| 5,655,366 | 8/1997 | Kawamura | 60/288 X |
| 5,787,706 | 8/1998 | Smedler et al. | 60/288 |
| 5,809,776 | 9/1998 | Holtermann et al. | 60/288 |

Primary Examiner—John E. Ryznic
Attorney, Agent, or Firm—Bill B. Berryhill

[57] ABSTRACT

Apparatus for controlling emissions from an internal combustion engine including an enclosed cylindrical housing and a converter assembly coaxially mounted in the housing for reducing noxious gases emitted from the engine. The converter assembly is characterized by a catalytic module transversely disposed within the housing at a predetermined location between an inlet and an outlet, thereof. The center of the catalytic module is formed by a cylindrical hub closed against flow of exhaust gases therethrough, surrounded by a catalytic cell of annular cross-section through which exhaust gases from the engine may flow, converting nitrogen oxides, carbon monoxide and unburned hydrocarbons to less noxious compounds before being discharged through the outlet. The hub is normally closed against flow of exhaust gases by a closure member. The closure member is openable in response to abnormal increases in pressure from the engine exhaust to prevent damage to the catalytic cell.

22 Claims, 3 Drawing Sheets

EMISSION CONTROL APPARATUS

BACKGROUND OF THE INVENTION

1. Field of the Invention

The present invention pertains to apparatus for use with internal combustion engines to reduce emission of noxious gases and noise emitted therefrom. More specifically, the present invention pertains to apparatus, particularly suited for use with a natural gas fueled engines, for converting nitrogen oxides, carbon monoxides and unburned hydrocarbons from the exhaust of such engines to less noxious compounds and for reducing the noise emitted therefrom.

2. Brief Description of the Prior Art

Both noise and air pollution have been of increasing concern in recent years. Silencers or mufflers for noise reduction of internal combustion engines have existed for many years. Most industrial silencers utilize some type of housing in which is mounted various types of baffles or other silencing components for reducing the noise produced at the exhaust of an internal combustion engine.

Of more recent and heightened concern is air pollution created by noxious gases emitted from the exhaust of an internal combustion engine, primarily nitrogen oxides, carbon monoxides and other unburned hydrocarbons. Catalytic converters have been developed through which the exhaust gases may be passed for converting the nitrogen oxides, carbon monoxide and unburned hydrocarbons to less noxious compounds before being discharged to the atmosphere. Problems associated with three-way catalytic converters have been identified as: precise air/fuel ratio control, deactivation of the catalyst and flow distribution in the catalytic converter. The flow distribution problem is the one least investigated and the one which holds most promise in increased efficiency and extended catalyst life.

Exhaust silencers and catalytic converters for internal combustion engines are governed by chemical, fluid flow, and acoustical characteristics. These characteristic interact with each other and when properly combined provide an efficient exhaust system for control of air and noise pollution.

Air pollution and noise abatement equipment may take many forms or configurations. For example, the engine may be provided only with a catalytic converter or with a catalytic converter first and then a silencer or with a silencer first and then a catalytic converter. In more recent years, catalytic converters and exhaust silencers have been combined in a single housing. Examples of such may be seen in U.S. Pat. Nos. 4,601,168; 5,016,428 and 5,184,464.

Especially in the manufacture of a combined catalytic converter and exhaust silencer all three disciplines or characteristics (chemical, fluid flow and acoustical) must be considered and properly balanced. Exhaust silencing quality, emissions reduction efficiency, and engine efficiency all depend upon a proper combination.

As previously stated, one of the primary problems to consider in a combined catalytic converter and exhaust silencer, particularly for efficiency of catalytic conversion, is flow distribution. In recent years, research has been conducted to determine the velocity profile of exhaust gases entering the frontal area of the catalyst module of a catalytic converter. One such study has been reported in a paper entitled Improvement of Catalytic Converters for Stationary Gas Engines by Using a Metal-Supported Catalyst, Y. Tsurumachi and A. Fujiwara and Y. Yamada all of Tokyo Gas Co., Ltd. Tokyo, Japan. Research has produced evidence that exhaust gases entering a catalytic converter housing at high velocity concentrate in the center core of the catalytic converter module in a pattern substantially the same diameter and area as the inlet. Other results of the research show that when a truncated conical inlet transition is provided exhaust gases recirculate around the transition causing flow maldistribution and scattered hot and cold spots in the frontal area of the catalyst module, reducing conversion efficiency.

Catalytic converters of relatively small frontal area result in increased impingement velocity and higher linear velocity through the catalyst depth. This creates higher back pressures, raising the mean effective pressure in the exhaust system between the catalytic converter and the engine exhaust valves. Undersized exhaust silencers can also increase the back pressure and when coupled with an undersized catalytic converter multiply the back pressure many times over, reducing operational efficiency of the engine.

Velocity control and pulsation dampening are products of capacity made possible by diameter and length. Diameter controls velocity and length controls expansion of exhaust gases to achieve design velocity and reduced pulsation level. In addition, staging pulsation (manifested as vibration and noise due to engine firing frequency) helps flow condition the exhaust gases upstream of the catalyst to assure even distribution of exhaust gases to the catalyst face.

From a chemical standpoint, residence time of exhaust gases through a catalyst module is important for catalytic reduction of toxic emissions. Research has determined that the linear velocity through the catalyst should be between 14 and 17 actual feet per second to provide optimum back pressure and residence time for conversion. In order to efficiently utilize the three characteristics or disciplines in the design of an internal combustion engine exhaust system, the catalytic converter module should be manufactured to accept exhaust gases at the prescribed velocity, maintaining linear velocity through the catalyst module depth while providing optimum residence and conversion therethrough.

Another problem associated with catalytic converters, whether in combination with a silencer or not, is the damage thereto that may be created by engine backfires. A typical engine backfire may result in an increase in pressure to as much as 100 psi. Such a rapid increase in pressure and velocity therefrom may actually blow a hole or otherwise damage the catalyst module of a catalytic converter. This would require replacement of an expensive, only partially otherwise depleted, catalytic cell or module. Some attempts have been made to overcome this problem, including the provision of relief valves in the engine exhaust piping prior to connection with the catalytic converter and relief valves in the housing of the catalytic converter itself. However, such valves do not typically react quickly enough to prevent damage to the catalytic cell. Improvements are needed.

SUMMARY OF THE PRESENT INVENTION

The present invention provides apparatus for controlling emissions from an internal combustion engine to reduce noxious gas emissions and to reduce noise therefrom. The apparatus includes an enclosed cylindrical housing having an inlet at one end thereof for connection with the exhaust of an internal combustion engine and an outlet at the opposite end thereof through which the exhaust gases may be discharged to the atmosphere. Both noise reduction means and noxious gas converter means may be disposed in the housing.

The converter means, coaxially mounted in the housing, is characterized by a catalytic module the center of which is formed by a cylindrical hub closed against flow of exhaust gases therethrough and which is surrounded by a catalytic cell of annular cross section the inner diameter of which is substantially the same as the outer diameter of the hub and the outer diameter of which is substantially the same as the inner diameter of the cylindrical housing. Exhaust gases from the engine flow from the housing inlet through the catalytic cell, where the nitrogen oxides, carbon monoxides and unburned carbons thereof are converted to less noxious compounds before being discharged through the outlet. By preventing flow through the center of the catalytic module and redistributing flow to the larger diameter catalytic cell of annular cross section, exhaust gases through the catalytic cell are more evenly distributed and the velocity thereof is reduced, increasing the residence time and efficiency of conversion in the catalytic cell.

The hub at the center of the catalytic module is normally closed against flow of exhaust gases by a closure member. However the closure member is operable in response to abnormal increases in pressure from the engine exhaust (such as occurs with backfire) to prevent damage to the catalytic cell. In a preferred embodiment, the closure member includes a replaceable rupture disk. In another preferred embodiment the closure member comprises a circular member the outer edges of which are seated against an annular seating surface by biasing means, the circular member being moveable away from the seating surface in response to abnormal increases in pressure from the engine exhaust. Thus protection is provided against destruction of the catalytic cell by back fires or other unusual pressure increases.

In preferred embodiments of the invention, the housing is divided by first and second partitions into three chambers: an inlet chamber, a converter chamber in which the catalytic cell is disposed and an outlet chamber. Each of the partitions is provided with a plurality of ports around the outer portions thereof providing for flow of exhaust gases from the inlet, through the inlet chamber, through the converter chamber and through the outlet chamber, prior to discharge through the outlet. Tubular members of various sizes and dispositions may be provided within the inlet and outlet chambers to reduce pulsation and noise emitted from the engine exhaust.

Thus, the present invention provides for reduction of noxious gases and, in preferred embodiments, reduction of noise, in a unique combination especially characterized by better distribution of exhaust gas flow through the catalytic converter portion thereof. It also greatly reduces the risk of damage from engine backfire or other abnormal increases in pressure. The combination provided by the emission control apparatus of the present invention is one which takes advantages of chemical, dynamic fluid flow and acoustic principals in a combination which results in superior reduction of noise and air pollution. Many other objects and advantages of the invention will be apparent from the description which follows in conjunction with the accompanying drawings.

DESCRIPTION OF PREFERRED EMBODIMENTS

Figure 1:
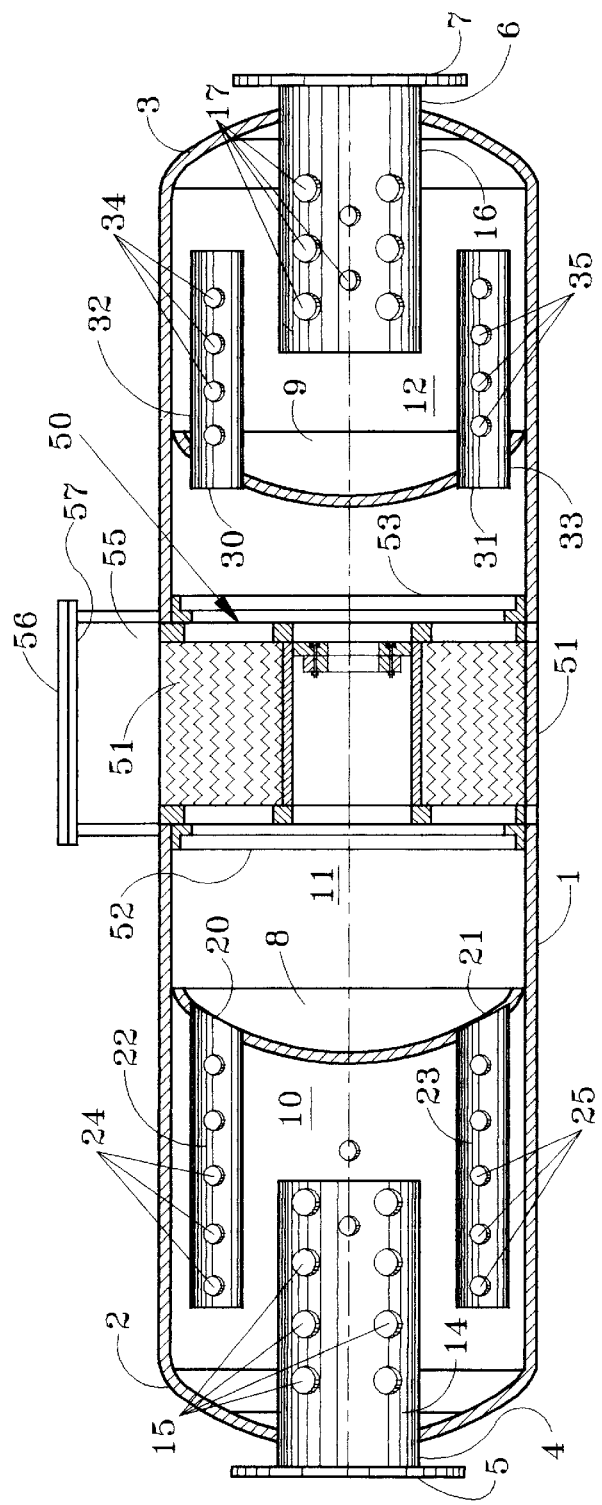
FIG. 1 is a longitudinal view, in section, of noise and emission control apparatus according to a preferred embodiment of the invention.
Figure 2:
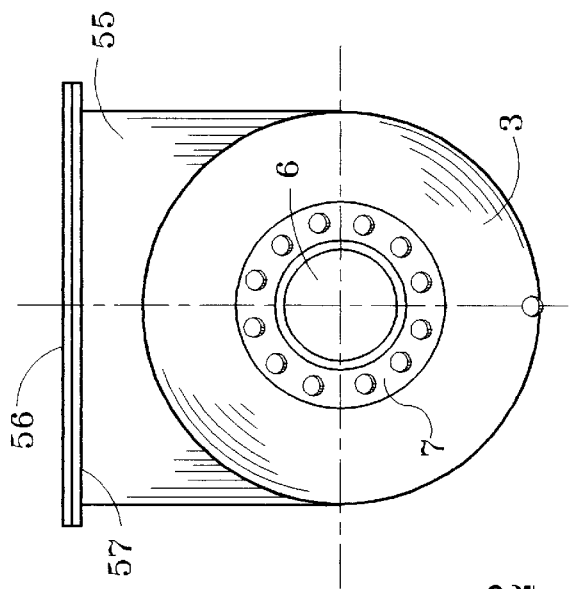
FIG. 2 is an end view of the combination noise and emission control apparatus of FIG. 1.

Referring first to FIGS. 1 and 2, there is shown combination noise and pollution control apparatus which includes a cylindrical housing 1 closed at opposite ends by dished or semispherical heads 2 and 3. The head 2 is provided with an inlet 4 surrounding which is a flange 5 by which the apparatus may be connected to the exhaust (not shown) of an internal combustion engine (not shown). The opposite head 3 is provided with an outlet 6 surrounding which is a flange 7. The flange 7 may be connected to a discharge pipe (not shown) for discharge into the atmosphere or for additional handling.

Actually the cylindrical housing 1 may be divided by first and second partitions 8 and 9 into three chambers: an inlet chamber 10, a converter chamber 11 and an outlet chamber 12. The partitions 8 and 9 may be conveniently formed of pressure vessel heads, similar to the heads 2 and 3 of the housing 1 welded in place within the housing 1. Since the exhaust gases and pressures created thereby flow from the inlet 4 toward the outlet 6, it is preferable that the convex side of the heads 8 and 9 face upstream.

In the preferred embodiment of FIG. 1, a central tubular member 14 extends from the inlet 4 into the inlet chamber 10 providing for flow of exhaust gases from the inlet 4 into the inlet chamber. Actually, the inlet 4 may be formed by one end of the tubular member 14. The walls of the central tubular member 14 may also be provided with perforations 15 which allow some of the exhaust gases to enter or exit the central tubular member therethrough. The diameter and length of the central tubular member 14 and the size and number of perforations 15 provided therein are selected to provide optimum pulsation and noise reduction and uniform flow distribution of the exhaust gases through the inlet chamber 10.

Another central tubular member 16 extends from the outlet 6 into the outlet chamber 12 and provides for flow of exhaust gases from the outlet chamber 12 for discharge through the outlet 6. The outlet 6 may actually be formed from a portion of the central tubular member 16. The tubular member 16 may also be provided with perforations 17 which allow some of the exhaust gases to enter or exit the central tubular member 16 therethrough. Like the central tubular member 14, central tubular member 16 and its perforation 17 are also selected of diameters, lengths and sizes primarily for effecting pulsation and noise reduction in the apparatus.

A plurality of ports 20, 21, etc. (two, three or more) are radially disposed around the outer portions of partition 8 a plurality of tubular members 22, 23, etc., each one of which extends into the inlet chamber 10 from one of the ports 20, 21 providing for the flow of exhaust gases passing from the inlet chamber 10 into the converter chamber 11. Thus, the centralized flow from the inlet 4 is redistributed to peripheral flow into the converter chamber 11. The walls of the tubular members 22, 23 may also be provided with perforations 24, 25, etc. allowing some of the exhaust gases to enter or exit the tubular members 22, 23, etc. therethrough.

The partition 9 may also be provided with a plurality of ports 30, 31, etc. around the outer portions thereof providing for flow of exhaust gases from the converter chamber 11 into the outlet chamber 12 prior to discharge through the outlet 6. A plurality of tubular members 32, 33 each one of which extends into the outlet chamber 12 from one of the ports 30, 31, etc. help direct the flow of exhaust gases from the converter chamber 11 into the outlet chamber 13. The walls of these tubular members 32, 33 may also be provided with perforations 34, 35, etc. which allow some of the exhaust gases to enter or exit the tubular members 32, 33 therethrough. The diameter and length of the tubular members 32 and 33 and the number and size of the perforations 34 and 35 are selected primarily for optimal pulsation and noise reduction characteristics.

Coaxially mounted in the converter chamber 11 is a catalytic converter module 50, more fully described hereafter, which converts nitrogen oxides, carbon monoxide and unburned hydrocarbons from engine exhaust gases entering the housing 1 through the inlet 4 to less noxious compounds before being discharged through the outlet 6. The catalytic converter module 50 is supported or enclosed in a cylindrical outer shell or housing 51 of relatively short axial length. The catalytic module 50 is supported upstream and downstream between inwardly directed radial flanges of support rings 52 and 53 welded or otherwise affixed within the converter chamber 11 of the housing 1. The cylindrical housing 1 may be provided with a side opening through which the catalytic module 50 may be removed for repair or replacement thereof. In the embodiment of FIGS. 1 and 2, the side opening is provided by an elongated housing 55 transversely disposed relative to the cylindrical housing 1 and providing an elongated opening which is normally closed by a removable closure member 56. The closure member 56 may be attached to a corresponding flange 57 surrounding the elongated opening of the housing 55 by nuts and bolts, clamps or any other suitable fastening means (not shown). When the closure member 56 is removed, the length of the elongated opening, which is perpendicular to the axis of the cylindrical housing 1, is substantially equal to the diameter of the housing and the width of the opening is at least as great as the axial length or depth of the catalytic module 50.

Figure 3:
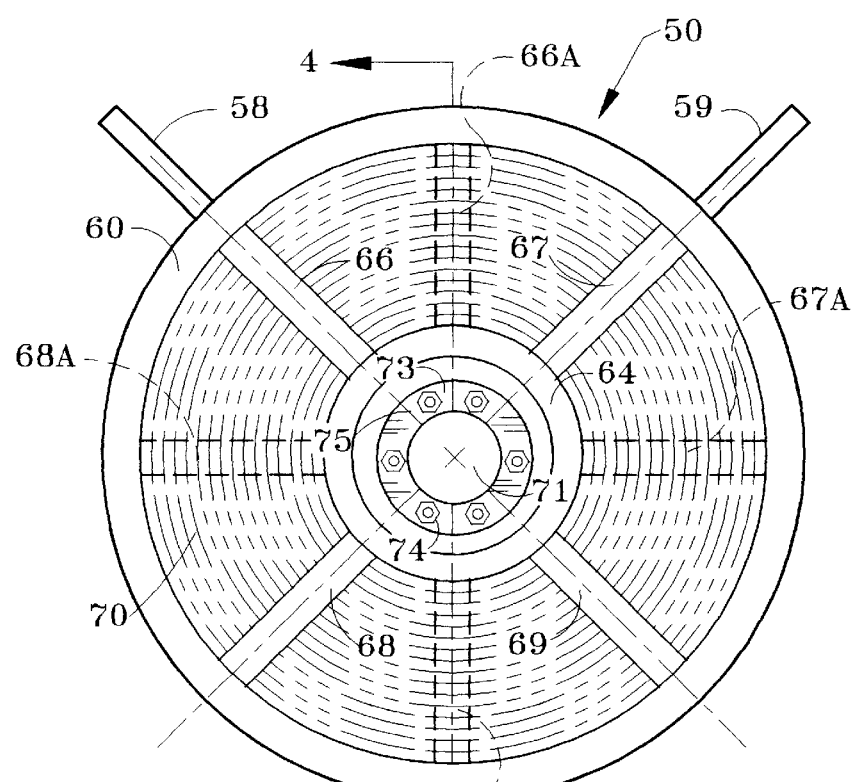
FIG. 3 is a front view of a catalytic module for use in the combination noise and emission control apparatus of FIG. 1, according to a preferred embodiment thereof.
Figure 4:
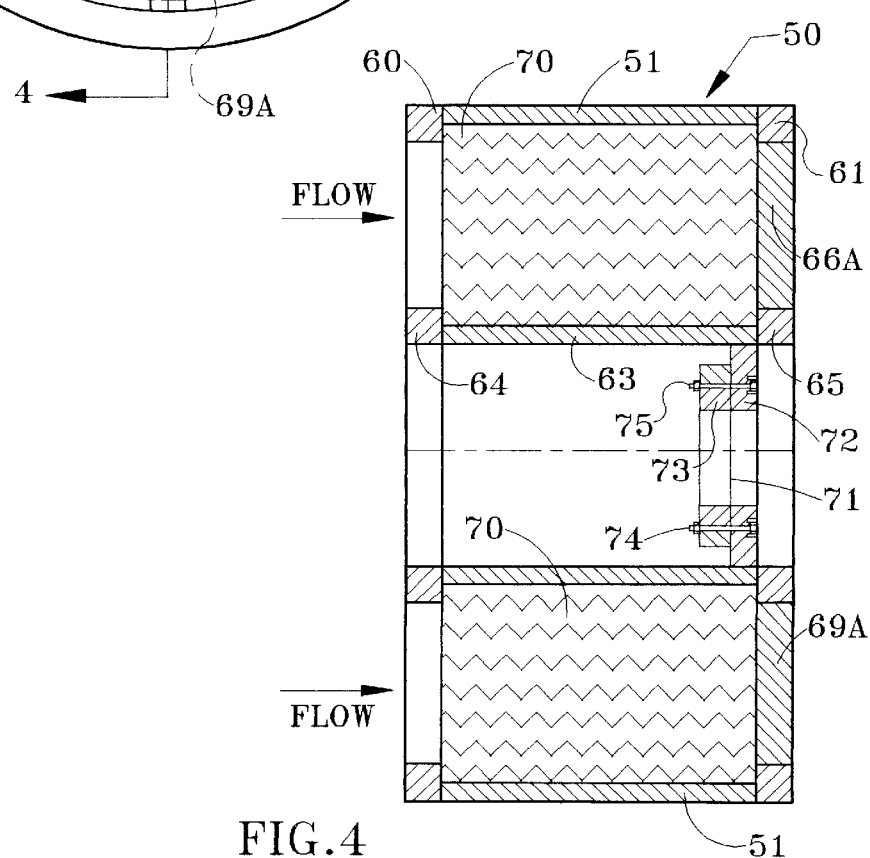
FIG. 4 is a cross sectional view of the catalytic module of FIG. 3 taken along lines 4—4 thereof.

Referring now to FIGS. 3 and 4, a preferred embodiment of the catalytic module 50 will be described. As previously stated, the module 50 may be outwardly defined by a cylindrical housing 51 at opposite ends of which are outer support rings 60, 61. The center of the catalytic module is formed of a cylindrical hub 63 at the opposite ends of which are support rings 64 and 65. The support rings may be mutually and coaxially supported by radial support members 66, 67, 68, 69 at the upstream face of the catalytic module 50. Similar radial supports 66A, 67A, 68A, 69A may be provided for mutual and coaxial support of rings 65 and 61 on the downstream face of the catalyst module. Handles 58 and 59 may be attached to the housing 51 for handling the catalytic module 50 and for lifting it in or out of the side opening provided by the housing 55. Surrounding the hub 63 and confined between the exterior of the hub 63 and the interior of the cylindrical housing 51 is a catalytic cell of annual cross section made up of a honeycomb like structure of two-way or three-way catalytic materials which convert nitrogen oxides, carbon monoxide and unburned hydrocarbons passing therethrough to less noxious compounds. The upstream and downstream faces of the catalytic module, in the annular cross sectional area of the catalytic cell 70, are substantially unobstructed allowing even flow of exhaust gases therethrough.

The cylindrical hub 63 which forms the center of the catalytic module 50 is normally closed against flow of exhaust gases therethrough by a closure member. In the embodiments of FIGS. 3 and 4, the closure member comprises a replaceable rupture disk 71 coaxially and transversely disposed within the cylindrical hub 63. The peripheral edges of the rupture disk 71 are sandwiched between a pair of annular flange members, the first 72 of which is affixed to the hub 63 and the second 73 of which is removably attached by fastening means to the first flange member 72 to allow replacement thereof. The fastening means illustrated in FIGS. 3 and 4 comprises a plurality of cooperating bolts and nuts 74, 75, the bolt heads of which may be disposed in recesses provided in the flange 72. One can readily understand that if pressure in the upstream portion of the converter chamber 11 reaches the rupture point of the rupture disk 71, the disk 71 will rupture, allowing flow of exhaust gases through the flanges 72 and 73 to relieve pressure within the housing 1 and specifically within the converter chamber 11 thus preventing rupture or destruction of the catalytic cell 70 surrounding the hub 63.

Figure 5:
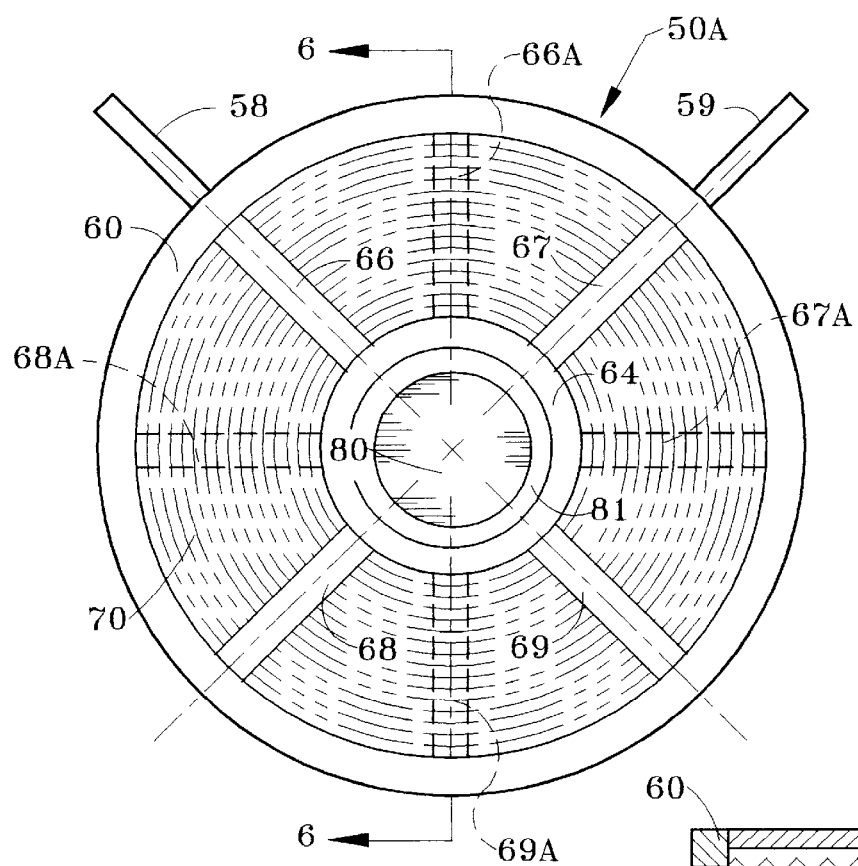
FIG. 5 is a front view of a catalytic module for use with the combination noise and emission control apparatus of FIG. 1 according to another preferred embodiment thereof.
Figure 6:
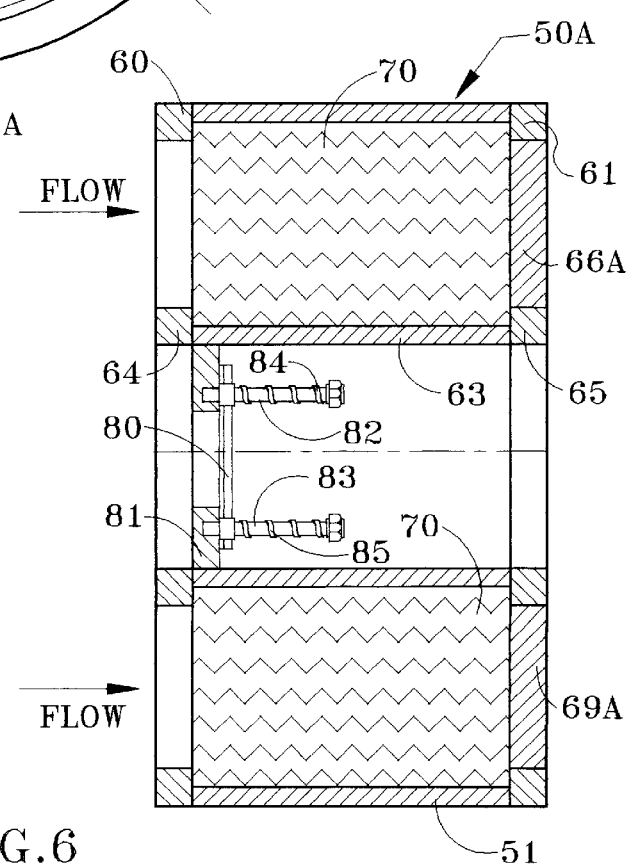
FIG. 6 is a cross sectional view of a catalytic module of FIG. 5 taken along lines 6—6 thereof.

FIGS. 5 and 6 illustrate a catalytic module 50A which is another preferred embodiment of the invention. The catalytic module 50A is similar in many respects to the catalytic module 50 of FIGS. 3 and 4 and similar or like parts thereof will be referred to by the same reference numbers. The catalytic module 50A comprises an outer cylindrical housing 51 and a central hub 63 between which is disposed or confined catalytic cell 70 of annular cross section. Support rings 60, 61, 64, 65 and support members 66, 67, 68, 69, 66A, 67A, 68A, 69A support all these components in the same manner as in the embodiment of FIGS. 3 and 4.

In the embodiment of FIGS. 5 and 6, the cylindrical hub 63 is also normally closed against flow of exhaust gases by a closure member. However, in this embodiment, the closure member comprises a circular plate 80 transversely and coaxially disposed within the cylindrical hub 63 and the outer edges of which are seated against an annular seating surface provided by flange like member 81 affixed to the hub 63. The outer edges of the circular closure member 80 are provided with a plurality of holes slidingly engaged by a plurality of stud members 82, 83, etc. which are threadedly connected to the flange member 81 for guiding the closure member 80 away from the seating surface if a substantial force of pre-determined pressure is exceeded in the upstream portion of the converter chamber 11. However, the stud members are provided with surrounding spring members 84, 85 which bias the closure member 80 toward engagement with the seating surface provided by the flange member 81, normally closing the cylindrical hub 63 to the passage of exhaust gases therethrough. If the pressure within the upstream portion of the converter chamber reaches a pre-determined level, the closure member 80 compresses the springs 84 and 85, opening passage through the hub 63 and allowing the relief of pressure therethrough.

Thus, the emission control apparatus of the present invention provides a unique catalytic converter in which the catalytic cell is annular in cross-section and surrounds a normally closed hub so that exhaust gases passing through the apparatus are more evenly distributed and flow at reduced velocities therethrough. This results in increased converter residence time, increased life of catalyst and greater efficiency in reducing noxious exhaust gases to less noxious gases for discharge to the atmosphere.

The central hub is normally closed by a closure member but which is operable in response to increased pressures, such as during engine backfires, to open a passage through the hub providing pressure relief and preventing damage to the catalytic converter. This avoids having to replace a partially depleted catalytic module with a new one.

The emission control apparatus of the present invention also provides, in a unique combination, noise reduction components. In preferred embodiments the apparatus comprises a cylindrical housing divided into three chambers: inlet, converter and outlet chambers. The inlet and outlet chambers are preferably provided with perforated tubular members of various sizes and dispositions designed to evenly distribute exhaust gas flow and to reduce noise produced by the internal combustion engine.

Although unique and complex in utilizing chemical, fluid flow and acoustical principles, the apparatus is relatively simple in construction and operation. Most importantly it is extremely efficient and cost effective in reducing noise and air pollution from internal combustion engines.

Although several embodiments of the invention are described herein, many variations will be apparent to those skilled in the art. Accordingly, it is intended that the scope of the invention be limited only by the claims which follow.

I claim:

1. Apparatus for controlling emissions from an internal combustion engine which includes an enclosed cylindrical housing having an inlet at one end thereof for connection with the exhaust of said internal combustion engine and an outlet at the opposite end thereof, converter means being coaxially mounted in said housing for reducing noxious gases emitted from said engine, said converter means being characterized by a catalytic module transversely disposed within said housing at a predetermined location between said inlet and said outlet, said catalytic module being formed by a centrally disposed non-perforated cylindrical hub surrounded by a catalytic cell of annular cross-section through which said exhaust gases from said engine flow, converting nitrogen oxides, carbon monoxide and unburned hydrocarbons to less noxious compounds before being discharged through said outlet, said hub providing a passage normally closed against flow of exhaust gases therethrough by a closure member, said closure member being operable in response to abnormal increases in pressure from said engine exhaust to open said hub passage to prevent damage to said catalytic cell, said closure member comprising a replaceable rupture disk transversely disposed within said cylindrical hub.

2. Emission control apparatus as set forth in claim 1 in which the peripheral edges of said rupture disk are sandwiched between a pair of annular flange members a first of which is attached to said hub and the second of which is removably attached by fastening means to said first flange member to allow replacement of said rupture disk.

3. Emission control apparatus as set forth in claim 1 in which said cylindrical housing is provided with a side opening normally closed by a removable member which when removed allows removal of said catalytic module for repair or replacement thereof.

4. Emission control apparatus as set forth in claim 1 in which said catalytic module is provided with one or more radially projecting handles which may be grasped for said removal thereof through said side opening.

5. Emission control apparatus as set forth in claim 1 in which said side opening is an elongated opening the length of which is perpendicular to the axis of said cylindrical housing and substantially equal to the diameter of said housing, the width of said opening being at least as great as the axial length of said catalytic module.

6. Emission control apparatus as set forth in claim 1 including noise reduction means mounted in said housing for reducing noise emitted from said engine, said noise reduction means including at least one tubular member upstream of said catalytic module providing fluid communication between said housing inlet and said catalytic module.

7. Emission control apparatus as set forth in claim 6 in which said noise reduction means includes at least one tubular member downstream of said catalytic module providing fluid communication between said catalytic module and said housing outlet.

8. Emission control apparatus as set forth in claim 7 in which the walls of at least one of said tubular members are perforated allowing some of said exhaust gases to enter or exit said tubular members therethrough.

9. Emission control apparatus as set forth in claim 1 including a first housing partition between said housing inlet and said converter means providing in said housing an inlet chamber and an adjacent converter chamber in which said converter means is disposed, a plurality of ports radially disposed around the outer portions of said partition, through which said exhaust gases pass from said first chamber into said converter chamber prior to flow through said catalytic cell of said catalytic module.

10. Emission control apparatus as set forth in claim 9 including a plurality of tubular members each one of which extends into said inlet chamber from one of said ports and through which said exhaust gases pass into said converter chamber.

11. Emission control apparatus as set forth in claim 10 in which the walls of said tubular members are perforated allowing some of said exhaust gases to enter or exit said tubular member therethrough.

12. Apparatus for controlling emissions from an internal combustion engine which includes an enclosed cylindrical housing having an inlet at one end thereof for connection with the exhaust of said internal combustion engine and an outlet at the opposite end thereof, converter means being coaxially mounted in said housing for reducing noxious gases emitted from said engine, said converter means being characterized by a catalytic module transversely disposed within said housing at a predetermined location between said inlet and said outlet, said catalytic module being formed by a centrally disposed non-perforated cylindrical hub surrounded by a catalytic cell of annular cross-section through which said exhaust gases from said engine flow, converting nitrogen oxides, carbon monoxide and unburned hydrocarbons to less noxious compounds before being discharged thorough said outlet, said hub providing a passage normally closed against flow of exhaust gases therethrough by a closure member, said closure member being operable in response to abnormal increases in pressure from said engine exhaust to open said hub passage to prevent damage to said catalytic cell, said closure member comprising a circular member transversely disposed within said cylindrical hub and the outer edges of which are seated against an annular seating surface provided by said hub, said outer edges of said circular member being unidirectionally moveable away from said seating surface in response to said abnormal increases in pressure from said engine exhaust to allow flow of exhaust gases through said hub passage.

13. Emission control apparatus as set forth in claim 12 in which said circular closure member is biased against said seating surface by biasing means engageable therewith.

14. Emission control apparatus as set forth in claim 13 in which said seating surface and said passage are provided by a flange-like member attached to said hub.

15. Emission control apparatus as set forth in claim 14 in which said outer edges of said circular closure member are provided with a plurality of holes through each one of which guide members attached to said flange-like member extend for guiding said closure member when moving away from said seating surface.

16. Emission control apparatus as set forth in claim 15 in which each of said guide members carries a spring member which engages said closure member, biasing said closure member toward said engagement with said seating surface.

17. Emission control apparatus as set forth in claim 1 in which said housing is divided by first and second housing partitions into three chambers: an inlet chamber, a converter chamber in which said converter means is disposed and an outlet chamber; each of said partitions being provided with a plurality of ports around the outer portions thereof providing for flow of said exhaust gases from said inlet through said inlet chamber, said converter chamber and said outlet chamber prior to discharge through said outlet.

18. Emission control apparatus as set forth in claim 17 including a plurality of tubular members each one of which extends into said inlet chamber from one of said first partition ports providing for flow of said exhaust gases from said inlet chamber into said converter chamber.

19. Emission control apparatus as set forth in claim 18 including a plurality of tubular members each one of which extends into said outlet chamber from one of said second partition ports providing for flow of said exhaust gases from said converter chamber into said outlet chamber.

20. Emission control apparatus as et forth in claim 19 in which the walls of one or more of said plurality of tubular members are perforated allowing some of said exhaust gases to enter or exit said tubular members therethrough.

21. Emission control apparatus as set forth in claim 19 including a central tubular member extending from said inlet into said inlet chamber and providing for flow of said exhaust gases from said inlet into said inlet chamber, another central tubular member extending from said outlet into said outlet chamber and providing for flow of exhaust gases from said outlet chamber for discharge through said outlet.

22. Emission control apparatus as set forth in claim 21 in which the walls of at least one of said central tubular member is perforated allowing some of said exhaust gases to enter or exit said central tubular member therethrough.

* * * * *